(12) United States Patent
Strom

(10) Patent No.: US 7,819,613 B2
(45) Date of Patent: Oct. 26, 2010

(54) SELF-TAPPING INSERT AND METHOD OF UTILIZING THE SAME TO REPLACE DAMAGED BORES AND THREADS

(76) Inventor: Carl Strom, 20422 Callon Dr., Topanga, CA (US) 90290

( * ) Notice: Subject to any disclaimer, the term of this patent is extended or adjusted under 35 U.S.C. 154(b) by 449 days.

(21) Appl. No.: 11/982,067

(22) Filed: Oct. 31, 2007

(65) Prior Publication Data

US 2009/0110509 A1    Apr. 30, 2009

(51) Int. Cl.
F16B 37/12    (2006.01)
F16B 25/00    (2006.01)

(52) U.S. Cl. ......................... 411/178; 411/386
(58) Field of Classification Search ................ 411/178, 411/386, 387.1, 387.4, 417, 418
See application file for complete search history.

(56) References Cited

U.S. PATENT DOCUMENTS

| | | | |
|---|---|---|---|
| 1,394,608 A * | 10/1921 | Davern | 411/390 |
| 1,949,618 A | 3/1934 | Mollberg | |
| 2,795,221 A | 6/1957 | Braendel | |
| 2,823,574 A * | 2/1958 | Rosan | 411/386 |
| 2,922,455 A | 1/1960 | Braendel | |
| 3,039,641 A * | 6/1962 | Rosan | 217/113 |
| 3,260,150 A | 7/1966 | Colman | |
| 3,402,613 A | 9/1968 | Neusel et al. | |
| 3,405,596 A | 10/1968 | Neuschotz | |
| 3,430,531 A | 3/1969 | Bosse | |
| 3,597,781 A | 8/1971 | Eibes et al. | |
| 3,662,643 A | 5/1972 | Scheffer | |
| 3,866,509 A | 2/1975 | Kraus et al. | |
| 4,022,099 A * | 5/1977 | Ballantyne | 411/383 |
| 4,097,061 A | 6/1978 | Dietlein | |
| 4,601,625 A | 7/1986 | Ernst et al. | |

(Continued)

FOREIGN PATENT DOCUMENTS

JP    02142910 A    6/1990

OTHER PUBLICATIONS

Gardserts Catalog, dated Mar. 14, 2007, obtained from www.gardspecialists.com website Oct. 2007.

*Primary Examiner*—Flemming Saether
(74) *Attorney, Agent, or Firm*—James M. Duncan, Esq.; Klein, DeNatale, Goldner, et al.

(57) ABSTRACT

A self-tapping insert is installed in a pre-existing bore hole in a workpiece by rotating the insert, causing cutting threads on the exterior of the self-tapping insert to cut new threads. Engagement threads on the exterior of the self-tapping insert engage the new threads to retain the self-tapping insert within the workpiece. The self-tapping insert may comprise internal threads which are used to replaced damaged threads in the workpiece. The exterior threads of the self-tapping insert may be configured as left-handed threads, while the internal threads are right-handed threads. The top of the self-tapping insert may comprise a plurality of castellations, and a drive head having matching castellations may be employed to install the self-tapping insert, eliminating the need for installing the insert with a drive bolt. The exterior of the self-tapping insert may further comprise a leading edge for cutting the new threads, where the leading edge has greater radial extension than the trailing edge. This feature provides greater chip relief, thereby reducing the torque required to install the self-tapping insert.

17 Claims, 6 Drawing Sheets

U.S. PATENT DOCUMENTS

| | | | |
|---|---|---|---|
| 4,730,968 A | | 3/1988 | Diperstein et al. |
| 4,971,502 A | * | 11/1990 | Oh .............................. 411/340 |
| 5,000,638 A | | 3/1991 | Essom et al. |
| 5,131,795 A | | 7/1992 | Kobusch |
| 5,211,520 A | | 5/1993 | McKinney |
| 5,547,323 A | | 8/1996 | Fang |
| 5,549,431 A | | 8/1996 | Royle |
| 5,755,542 A | | 5/1998 | Janusz et al. |
| 6,052,274 A | * | 4/2000 | Remsburg .............. 361/679.58 |
| 6,261,039 B1 | | 7/2001 | Reed |
| 6,382,893 B1 | | 5/2002 | Reed |
| 6,391,058 B1 | * | 5/2002 | Kuslich et al. ........... 623/17.11 |
| 6,435,788 B2 | | 8/2002 | Reed |
| 6,530,731 B2 | | 3/2003 | Wheeler |
| 7,140,825 B2 | | 11/2006 | Takahashi et al. |
| 7,322,978 B2 | | 1/2008 | West, Jr. |
| 7,465,137 B2 | * | 12/2008 | Dietz et al. .................. 411/386 |
| 2002/0131843 A1 | | 9/2002 | Chen-Chi et al. |
| 2004/0015172 A1 | * | 1/2004 | Biedermann et al. .......... 606/73 |
| 2004/0136807 A1 | | 7/2004 | Foerster, Jr. |
| 2006/0013671 A1 | | 1/2006 | Lauderbaugh |
| 2006/0115345 A1 | | 6/2006 | Mardinger et al. |
| 2007/0053763 A1 | | 3/2007 | Allaart et al. |
| 2007/0053764 A1 | | 3/2007 | Gahler et al. |

* cited by examiner

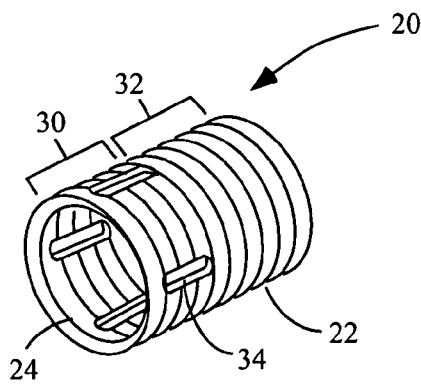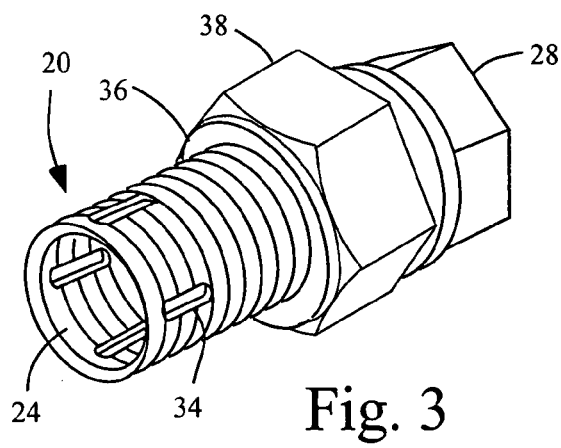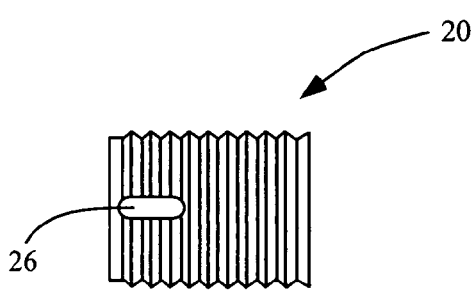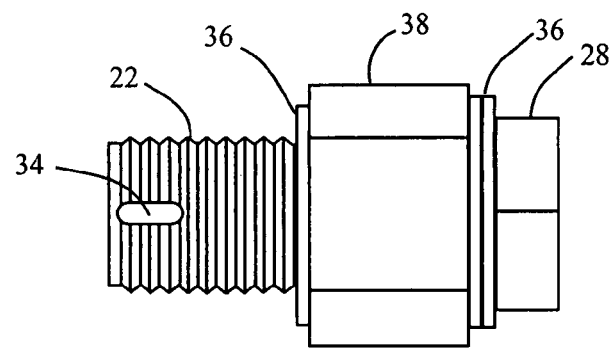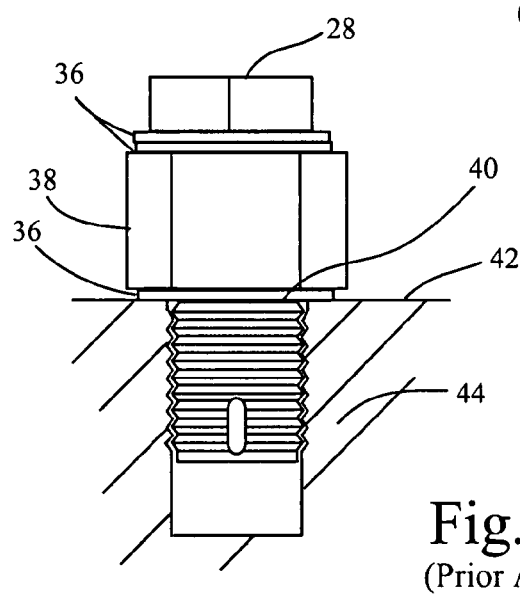
Fig. 1 (Prior Art)
Fig. 3 (Prior Art)
Fig. 2 (Prior Art)
Fig. 4 (Prior Art)
Fig. 5 (Prior Art)

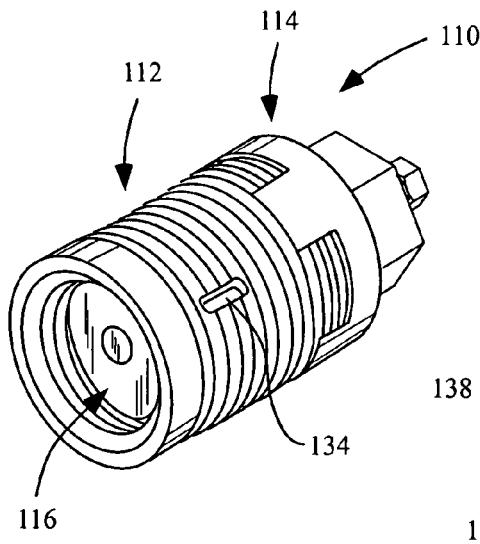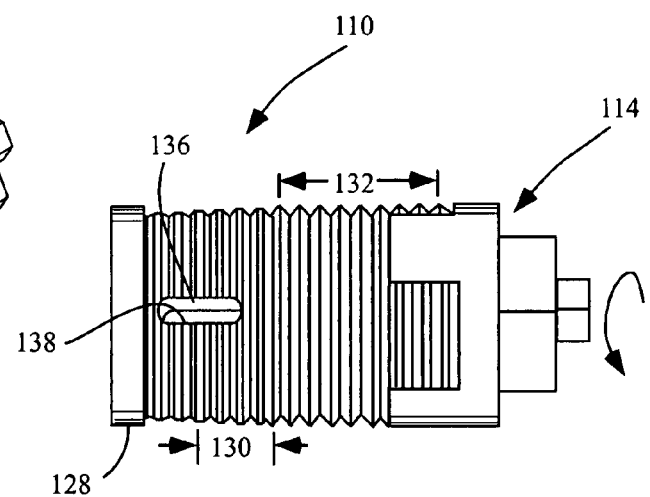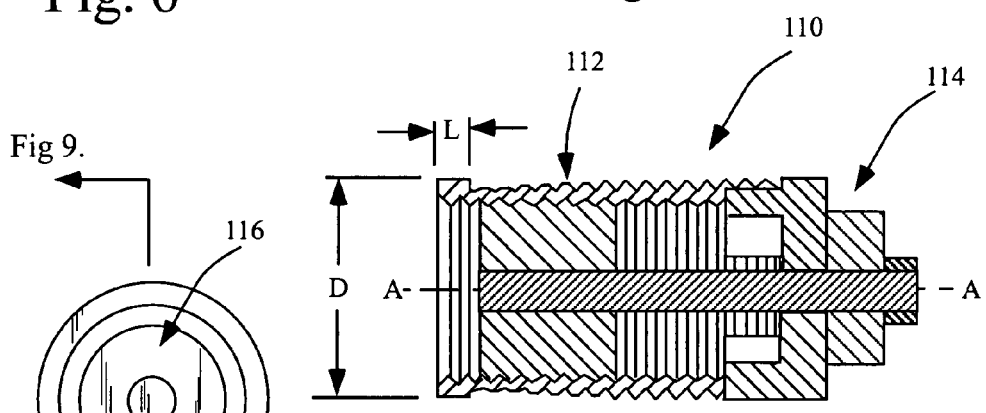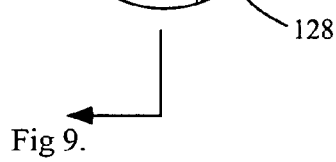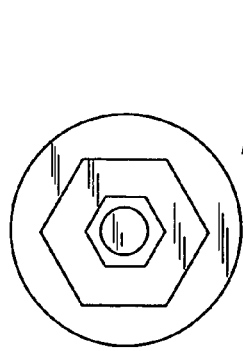
Fig. 6
Fig. 7
Fig. 8
Fig. 9
Fig. 10

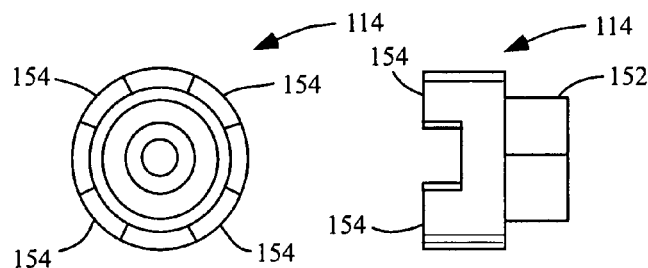
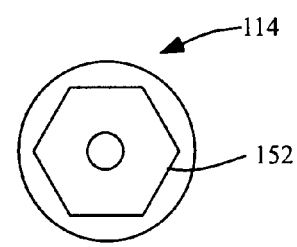
Fig. 13A    Fig. 13B    Fig. 13C
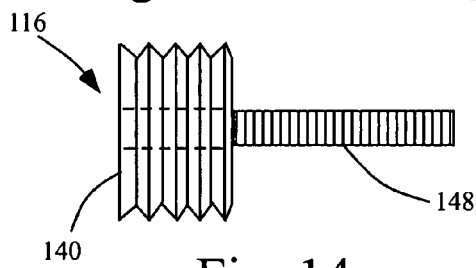
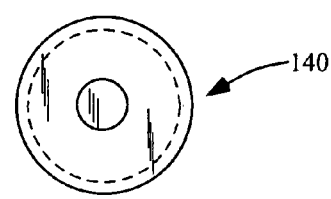
Fig. 14    Fig. 15
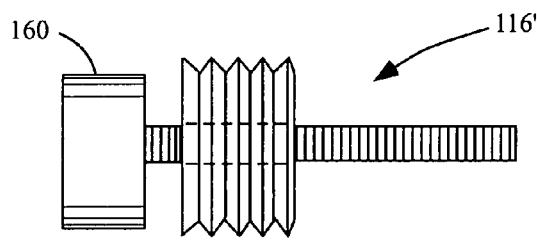
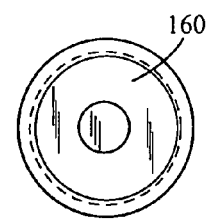
Fig. 16    Fig. 17
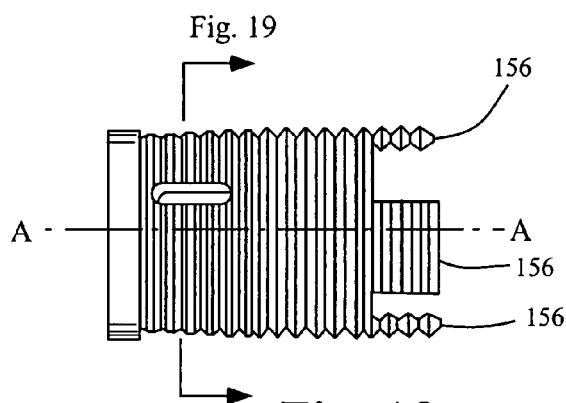
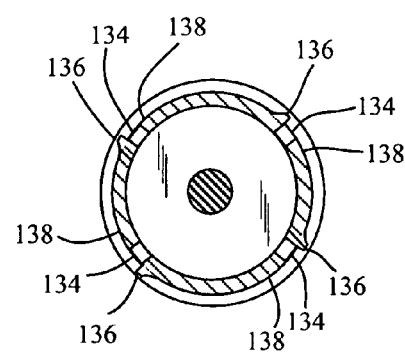
Fig. 18    Fig. 19

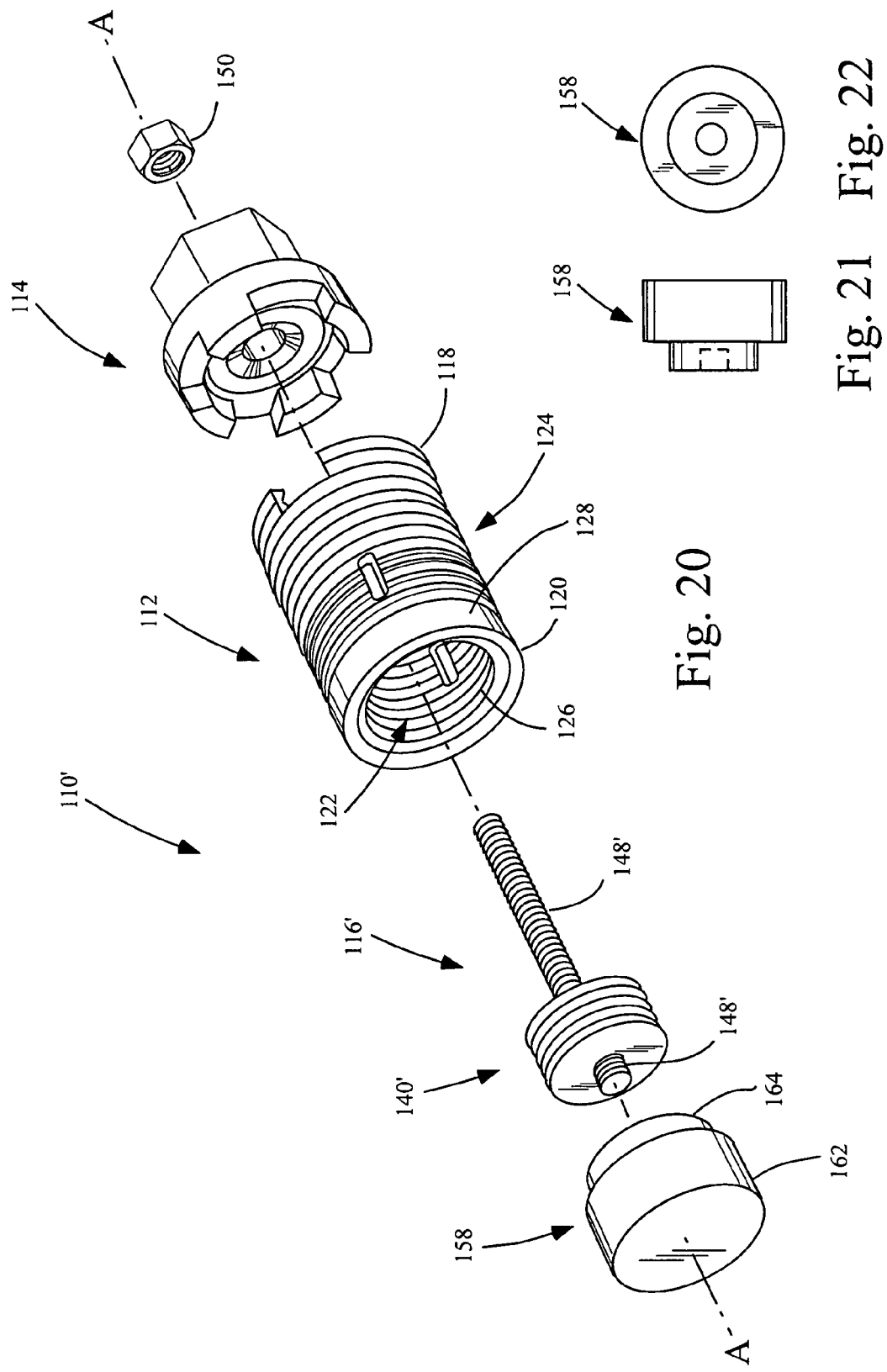

SELF-TAPPING INSERT AND METHOD OF UTILIZING THE SAME TO REPLACE DAMAGED BORES AND THREADS

BACKGROUND OF THE INVENTION

The present invention generally relates to fasteners and threaded workpieces, and more particularly to affixing an internally threaded insert within a workpiece so that a threaded fastener may be made up to the workpiece utilizing the threads of the insert.

For a variety of reasons it is desirable to dispose a self-tapping sleeve within a workpiece. Most, but not all of the time, the self-tapping sleeve will have internal threads and will be utilized for thread replacement. For example, if pre-existing threads of the workpiece are damaged, the damaged threads may be replaced with the threads of the insert. One type of internally-threaded insert is self-tapping, such that the insert may be driven into a bore of the workpiece, cutting threads in the bore as the insert is driven. The self-tapping inserts have both internal threads for receiving a fastener and external threads. A first group of external threads cuts new threads in the bore, and a second group of external threads makes up into the new threads, thereby advancing and securing the self-tapping insert within the bore and thus providing new threads within the workpiece.

The most common use of self-tapping inserts is to provide replacement threads where the original threads of the workpiece have become damaged, and to stabilize the matrix material to prevent cracks from continuing or propagating. When the original threads become damaged, they can sometimes be repaired by chasing the damaged thread with a tap to restore the original thread shape. However, if the original thread shape cannot be restored by this measure, the thread must be replaced. One means of replacing the threads is to bore the hole to a larger diameter than the original thread diameter and to rethread the hole. However, a disadvantage of this procedure is that it requires a change in the fastener size from the original. If the equipment utilizes multiple fasteners of the original size, the different size fastener complicates maintenance and repair of the equipment because different tools are required, and correlating fasteners with the matching threads made more difficult. It is therefore desirable in some cases to be able to replace the original threads with threads of the same size so that the same size fastener may be utilized. In these cases, self-tapping inserts may be employed.

Self-tapping inserts are hardened steel cylinders, threaded on the exterior and, usually, in the interior. The interior thread diameter and pitch of the internal threads are those of the fastener to be installed. However, it is to be appreciated that there are times when it is desirable to replace a smooth bore which has been damaged for one reason or another with a new smooth bore. For example, in the stamping industry, a smooth hole utilized for a position pin may become damaged and need to be replaced.

The exterior of the self-tapping insert comprises a section which cuts new threads (the "cutting section") and a section of threads which make up into the newly cut threads. The cutting section of the known self-tapping inserts is tapered and usually comprises three or more slots or holes, which interrupt the tapered threads, thereby forming teeth similar to those of a conventional thread tap. Typically a bolt (the "drive bolt") is used to drive the self-tapping insert into a pilot hole in the base metal. This pilot hole is usually made by drilling out the damaged threads as described above to form a bore hole in the base metal. As the insert is turned, the teeth of the cutting section engage and remove the base metal until the insert is fully installed and flush with the exterior surface of the workpiece. The insert remains in place within the workpiece by an interference fit between the newly cut threads in the workpiece and the exterior threads on the insert.

The known self-tapping inserts have several disadvantages. Because the known self-tapping inserts are tapered on the tapping end (i.e., the end which is first inserted into the bore hole), the inserts have a tendency to start tapping crookedly. The person performing the tapping procedure has no simple way other than by visual inspection to ascertain whether the insert is entering the bore hole straight—i.e., whether the longitudinal axis of the insert coincides with the longitudinal axis of the bore hole. The only way to ensure that the prior-art insert enters the bore straight is to utilize a magnetic drill ("mag drill") which attaches to the work-piece with an electromagnet. An example of such a mag drill is disclosed in U.S. Pat. No. 3,969,036 (Hougen). The procedure requires: (1) positioning the mag drill by means of a centering tool; (2) replacing the centering tool with a drill bit and drilling out the damaged threads; (3) customizing the drive bolt by removing its head so that it can be fitted to the chuck of the mag drill; (4) with the mag drill maintained in exactly the same location as established in step (1), threading the prior art insert onto the modified drive bolt and installing the modified drive bolt into the chuck of the mag drill; (5) driving the prior art insert two to three rotations with the mag drill, until it has started to cut new threads; and (6) completing the installation with a wrench, socket wrench, pneumatic impact wrench, mechanical torque multiplier, or hydraulic torque multiplier, depending upon the torque required to install the prior art insert.

It is important that the insert be installed straight, which means it must be correctly aligned at the initiation of the installation procedure. If the insert is too crooked during installation, the insert may shatter when partially installed because of the hardness of the insert. If the insert is installed crooked and does not shatter, the fastener will often not align correctly with the insert. The alignment problem becomes more severe for larger inserts. In recognition of this problem, one manufacturer of self-tapping inserts requires that the installation method for larger diameter inserts (such as larger than ¾ inch) include counter-boring or partially pre-tapping the pilot hole for the insert such that the insert will be properly aligned within the hole. Counter-boring or pre-tapping the pilot holes are demanding, time-consuming and expensive procedures requiring large-diameter drill bits and/or taps, often under difficult field conditions.

When a prior-art self-tapping insert is used to rethread a bore (or provide a threadless bore as the need may arise), the insert is driven in a clockwise rotation. As a consequence of this clockwise rotation, the exposed edge (hereinafter the "leading edge") of an opening in the wall of the insert acts as a cutting edge for cutting the new threads as the leading edge cuts into the wall of the bored hole. The edge on the opposite side of the opening from the leading edge is hereinafter referred to as the "trailing edge". On the known self-tapping inserts, the leading edge and trailing edge are of equal height. As a consequence of the equal height, metal chips created by the cutting of the new threads are forced into the new threads as the new threads are being created, causing binding and galling. The binding and galling require a very high torque and/or a combination of high torque and impact from heavy-duty pneumatic or hydraulic tools to overcome to properly seat the insert within the hole. As a consequence of the high torque requirement, another disadvantage of the known self-tapping inserts is manifested. The known self-tapping inserts cannot be through-hardened to a hardness of more than 52RC to 54RC without a risk of cracking, metal fatigue, etc. resulting from the application of the necessary torque and impact to properly seat the insert because of the galling and binding described above. This limitation on the hardness of known self-tapping inserts prevents use of the inserts in workpieces in which the base metal has a greater hardness, because the inserts are not sufficiently hard to cut threads in the base metal.

The known self-tapping inserts generally rely upon an interference fit between the newly cut threads and the external threads of the insert to prevent the insert from backing out of the base metal. The small metal chips generated by the cutting action of the insert assist the interference fit by wedging between the external threads of the insert and the new threads of the base metal. While this phenomenon is effective in preventing back-out of the insert from the base metal, it increases the torque requirements for installing the insert as described above.

The method of installing the known self-tapping inserts presents another disadvantage. The known self-tapping inserts are installed with a drive bolt having the same diameter and thread pitch as the insert. A nut and/or a combination of a nut and washers are utilized as a spacer between the head of the drive bolt and the insert. This spacer acts as a stop when the insert is inserted to the point that the top side of the insert is flush with the top surface of the workpiece. Because of the high torque levels required to install conventional self-tapping inserts, the drive bolt can seize up within the insert, particularly with the larger diameter inserts, causing the prior art insert to back out of the workpiece upon removal of the drive bolt. With this installation method, and because of the interaction of the chips with the exterior threads of the insert and the newly cut threads in the base metal, once this type of self-tapping insert is installed it cannot be removed. Moreover, with the drive bolt method of installation, the insert cannot be mounted such that the top side of the insert is placed below the top surface of the workpiece without creating custom tooling.

A need therefore exists for a self-tapping insert which satisfies one or more of the following criteria: (1) consistently remains aligned within the workpiece without the need for counter-boring and/or pre-tapping; (2) having a hardness in excess of 54RC yet capable of being installed without shattering; (3) a reduction in the necessary installation torque; and (4) having an installation method which prevents backing out of the insert from the workpiece because of seizing/galling with the drive bolt during the act of installation, or because the workpiece's installed fastener has itself seized with the insert.

SUMMARY OF THE INVENTION

The present invention is directed to embodiments of a self-tapping insert which meets one or more of the needs identified above. The disclosed self-tapping insert is utilized to provide new threads within the smooth bore of a workpiece. If the insert is utilized to provide new threads to replace damaged threads, the damaged threads are drilled out to provide the smooth bore.

An embodiment of the disclosed self-tapping threaded insert comprises a cylindrical body having a top, a bottom, an interior portion and an exterior portion, where the cylindrical body defines a central axis. The interior portion of the insert may comprise a first set of threads, or, in some cases, the interior portion of the insert may comprise a smooth bore. The exterior portion comprises tapping or cutting threads and engagement threads and a pilot section. In relative order from the bottom of the cylindrical body (i.e., the end of the insert first inserted within the borehole), the exterior portion of the insert comprises a pilot section, a plurality of cutting threads, and a plurality of engagement threads.

The pilot section has a external diameter along its entire length which is sized such that the pilot section penetrates the smooth bore, but the tolerances between the smooth bore and pilot section are close (for example, 0.003" per side). The diameter of the pilot section defines a plane which is perpendicular to the central axis of the cylindrical body. The pilot section has sufficient length to maintain the central axis of the self-tapping insert in general alignment with the longitudinal axis of the smooth bore, such that the insert is not crooked or out of alignment with the bore.

An embodiment of the self-tapping insert further comprises a pilot extension member which is removeably attached to the device. The pilot extension member increases the effective length of the pilot section to allow greater penetration of the device within the pilot hole, thereby reducing the angle of deflection between the longitudinal axis of the smooth bore and the central axis of the self-tapping insert. The pilot extension member may be utilized in cases in which the tolerances between the smooth bore and the pilot section are so large as to allow excessive play between the smooth bore and the pilot section, which may, without the pilot extension member, result in a misaligned self-tapping insert.

The cutting threads comprise means for cutting threads in the smooth bore which are used for locking the insert within the bore. The engagement threads thereafter engage the insert locking threads as the insert is made up into the bore. A driving means is required to drive the body of the insert into the bore until the insert is completely seated within the bore.

Embodiments of the apparatus comprise means for cutting threads in the smooth bore. The thread cutting means may comprise one or more apertures in the cylindrical body where the apertures extend from the exterior portion to the interior portion of the insert, where each aperture comprises at the exterior portion a leading edge and a trailing edge. The apertures may be circular, oval, or elongated slots. The "height" (i.e., the radial extension) of the leading edge may be greater than that of the trailing edge. That is, if a first diameter is defined by the rotation of the leading edge about the central axis of the cylindrical body and a second diameter is defined by the rotation of the trailing edge about the central axis, the first diameter would be greater than the second diameter. This feature of the apparatus is referred to as "chip relief", because it allows the chips generated in the tapping operation to escape easily. This feature is distinct from known self-tapping inserts in which the leading edge and trailing edge have the same height.

Embodiments of the apparatus may further comprise left-handed threads for the cutting threads and the engagement threads. The use of left-handed threads on the exterior portion of the insert prevents the insert from backing out of the work-piece when a fastener is backed out of the insert, which might otherwise occur if the fastener seizes up inside the insert due to galling, corrosion, etc. For this embodiment, the application of counter-clockwise torque to break the fastener free results in the tightening of the insert within the base metal of the workpiece.

Embodiments of the apparatus may comprise driving means which complement the use of left-handed threads for the cutting threads and the engagement threads, and may extend part way from the exterior portion to the interior portion. The top of the insert may comprise a plurality of castellations which extend from the exterior portion to the interior portion. The driving means may comprise a driving head having an insert engagement end and a tool engagement end.

The insert engagement end of the driving means may comprise a second plurality of castellations which are configured to engage the plurality of castellations on the top of the insert. The tool engagement end may comprise means, such as a hex head, for attachment of a tool for rotating the driving head, and thus the self-tapping insert. It is to be appreciated that the use of the matching castellations of the insert and drive head allows the self-tapping insert to be installed with left-handed rotation, while the inside threads of the insert remain right-handed threads. In addition, because the driving head may have a smaller diameter than the diameter of the self-tapping insert (and the bore), this arrangement allows the top of insert to be set below the surface of the workpiece rather than flush with the surface of the workpiece as characteristic of the known self-tapping inserts.

The driving means may further comprise an insert support plug which comprises a threaded plug member and an axially-aligned threaded stud extending from the threaded plug member. The threaded plug member makes up into the internal threads of the self-tapping insert, while the threaded stud attaches through a smooth opening in the driving head and is retained by a nut. The insert support plug provides internal support to the insert to prevent cracking and serves to draw the castellations of the drive head tightly into the matching castellations of the self-tapping insert.

Chip recovery means, such as a magnetized portion of the insert support plug or a separate magnet may be utilized with the insert support plug to assist in recovering chips generated from the thread cutting operation. The insert support plug and magnet may be so disposed within the self-tapping insert so that the magnet is located beneath the apertures. Once the insert is fully installed, the installation tool, internal support plug, and magnet are removed, and the chips with them.

Methods of replacing damaged threads utilizing embodiments of the disclosed apparatus generally comprise the steps of drilling out the damaged threads to create a pilot hole. An embodiment of the apparatus having left-handed external threads is inserted into the pilot hole and left-handed rotation of the self-tapping insert is applied by attaching a drive head to the insert. The drive head and the top of the insert may each comprise matching castellations which are configured to be temporarily connected together. The use of castellations as opposed to a threaded drive device attached to internal threads of the insert allows the use of left-handed external threads.

These and other features, aspects, and advantages of the present invention will become better understood with regard to the following description, appended claims, and accompanying drawings.

BRIEF DESCRIPTION OF THE DRAWINGS

FIG. 1 is a perspective view of a prior art self-tapping insert.

FIG. 2 is a side view of the prior art self-tapping insert depicted in FIG. 1.

FIG. 3 is a perspective view of the prior art self-tapping insert shown in FIG. 1 attached to a drive bolt and utilizing a nut and washers for spacers.

FIG. 4 is a side view of the prior art self-tapping insert and drive bolt combination shown in FIG. 3.

FIG. 5 schematically shows a prior art self-tapping insert, as ideally disposed within the bore hole of a workpiece prior to the removal of the drive bolt.

FIG. 6 is a perspective view of an embodiment of the disclosed self-tapping insert.

FIG. 7 is a side view of the embodiment shown in FIG. 6.

FIG. 8 is a bottom view of the embodiment shown in FIG. 6.

FIG. 9 is a sectional view of the embodiment shown in FIG. 8 taken along line 9-9.

FIG. 10 is a top view of the embodiment shown in FIG. 6.

FIGS. 13A through 13C show an embodiment of the driving head of the self-tapping insert depicted in FIG. 11.

FIG. 14 shows a side view of the insert support plug of the self-tapping insert depicted in FIG. 11.

FIG. 15 shows a bottom view of the insert support plug depicted in FIG. 14.

FIG. 16 shows another embodiment of an insert support plug comprising a magnet for chip recovery.

FIG. 17 shows a bottom view of the insert support plug depicted in FIG. 16.

FIG. 18 shows a side view of an embodiment of the exterior portion of the cylindrical body of the self-tapping insert depicted in FIG. 11.

FIG. 19 is a sectional view of the embodiment depicted in FIG. 18 taken along line 19-19, showing the leading edges and trailing edges of the cutting threads.

FIG. 20 is an exploded view of an embodiment of the disclosed self-tapping insert having a removable pilot extension member.

FIG. 21 is a side view of the removable pilot extension member of FIG. 20.

FIG. 22 is a bottom view of the removable pilot extension member of FIG. 20.

DETAILED DESCRIPTION OF THE EMBODIMENTS

Figure 11:
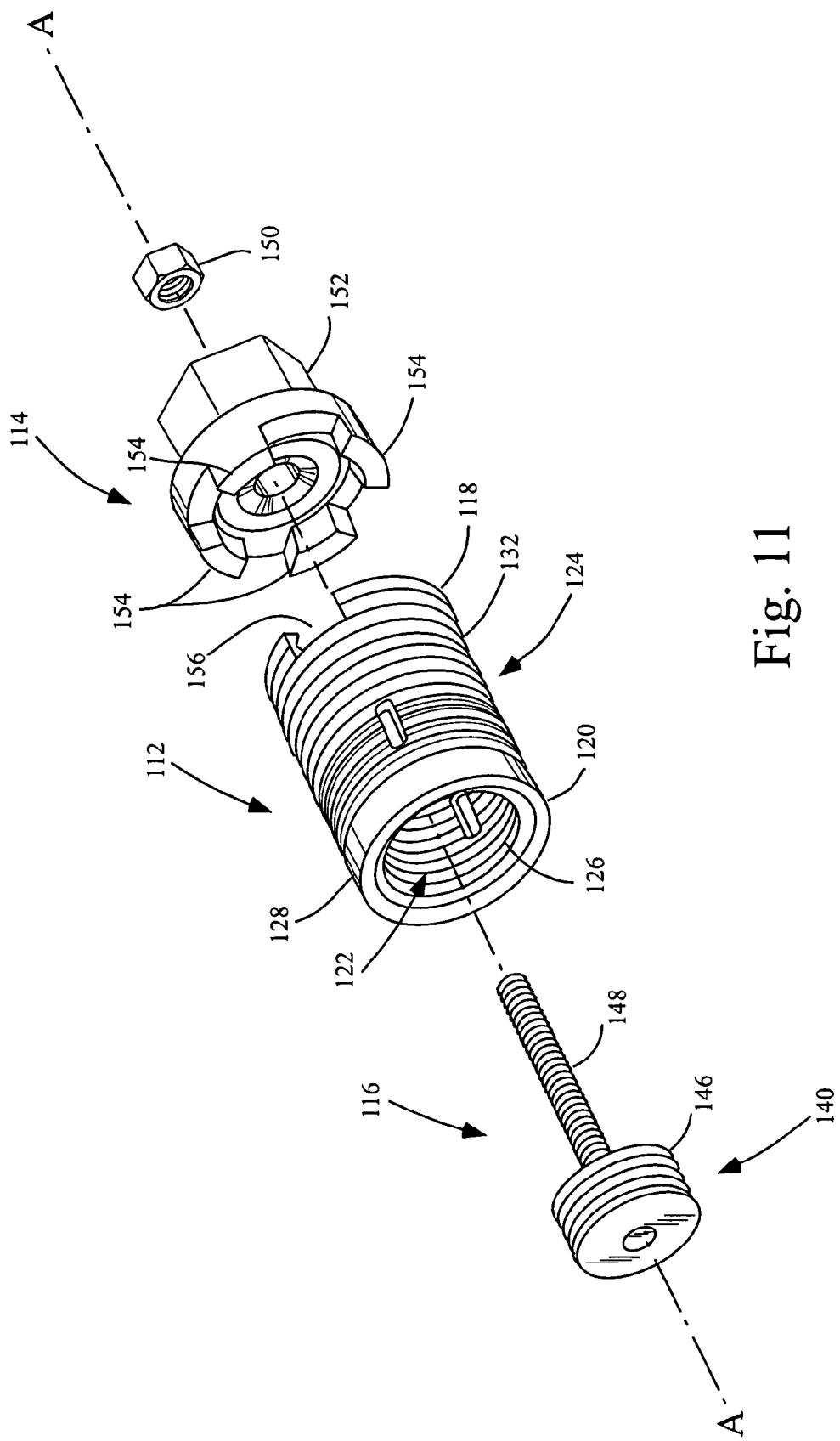
FIG. 11 is an exploded view of an embodiment of the disclosed self-tapping insert.

When the threads of a workpiece cannot be repaired by chasing the damaged thread with a tap to restore the original thread shape, replacement of the threads with a self-tapping insert provides an alternative method of repair. The pilot hole is usually made by drilling out the damaged threads to form a smooth walled bore hole in the base metal, and the prior art insert is placed within the bore hole.

Referring now specifically to the drawings, FIGS. 1 through 4 show a prior art self-tapping insert 20, which is a hardened steel cylinder, threaded on the exterior and interior. The prior art insert 20 comprises external threads 22, internal threads 24 and apertures 26. The prior art self-tapping insert 20 is generally installed with drive bolt 28 which makes up into internal threads 24 of the insert. The diameter and pitch of interior threads 24 are those of the fastener to be installed. The exterior of the self-tapping insert 20 comprises a first section 30 which cuts new threads (the "cutting section") and a second section 32 which comprises threads which make up into the newly cut threads.

Drive bolt 28 is used to drive the prior art self-tapping insert 20 into a pilot hole in the workpiece 44 as schematically shown in FIG. 5. The cutting section 30 of the known self-tapping inserts is tapered and usually comprises three or more apertures 26 which interrupt the tapered threads. As the drive bolt 28 is rotated clock-wise (turned right-handed), the leading edges 34 of the apertures 26 engage and remove the base metal until the insert is fully installed and flush with the top surface 42 of the workpiece 44. Referring to FIG. 3, the term "leading edge" is defined as the edge of the aperture 26 which, as the insert 20 is rotated clock-wise, is the cutting edge.

The insert remains in place within the workpiece 44 by an interference fit between the newly cut threads in the workpiece and the threads of the second section 32 of the insert 20. Spacers, such as washers 36 or nut 38 are utilized to allow the top of the prior art insert 20, once installed, to be flush with the top surface 42 of the workpiece. However, as illustrated in FIG. 5, the larger diameter of the head of drive bolt 28, the washers 36, and nut 38, prevent setting the top 40 of the insert 20 below the top surface 42 of the workpiece 44 without substantial modifications to the tool configuration. It is to be appreciated that FIG. 5 depicts the ideal installation of a prior art self-tapping insert 20 into a workpiece 44, i.e., where the insert is straight with respect to the borehole such that the longitudinal axis of the insert is generally aligned with the axis of the bore hole.

FIGS. 6 through 21 show different embodiment of the disclosed self-tapping insert 110 and components thereof. As best shown in the exploded view of FIG. 11, this embodiment may comprise a cylindrical body 112, a driving head 114, and an insert support plug 116. The components of the disclosed self-tapping insert 110 may be fabricated from various materials having the requisite mechanical properties based upon the material of the workpiece. Suitable materials comprise steel and various alloy steels. The hardness of self-tapping insert 110 will be higher than the hardness of the base material. As discussed above, various features of embodiments of the disclosed apparatus, and the methods for installing the apparatus, allow the use of harder metals for the self-tapping insert, because the torque required to install the disclosed self-tapping insert is not as high as for the known self-tapping inserts. Instead of being limited to hardness values of approximately 54RC, the disclosed self-tapping insert have a greater hardness value because of the reduced risk of shattering during installation.

Figure 12:
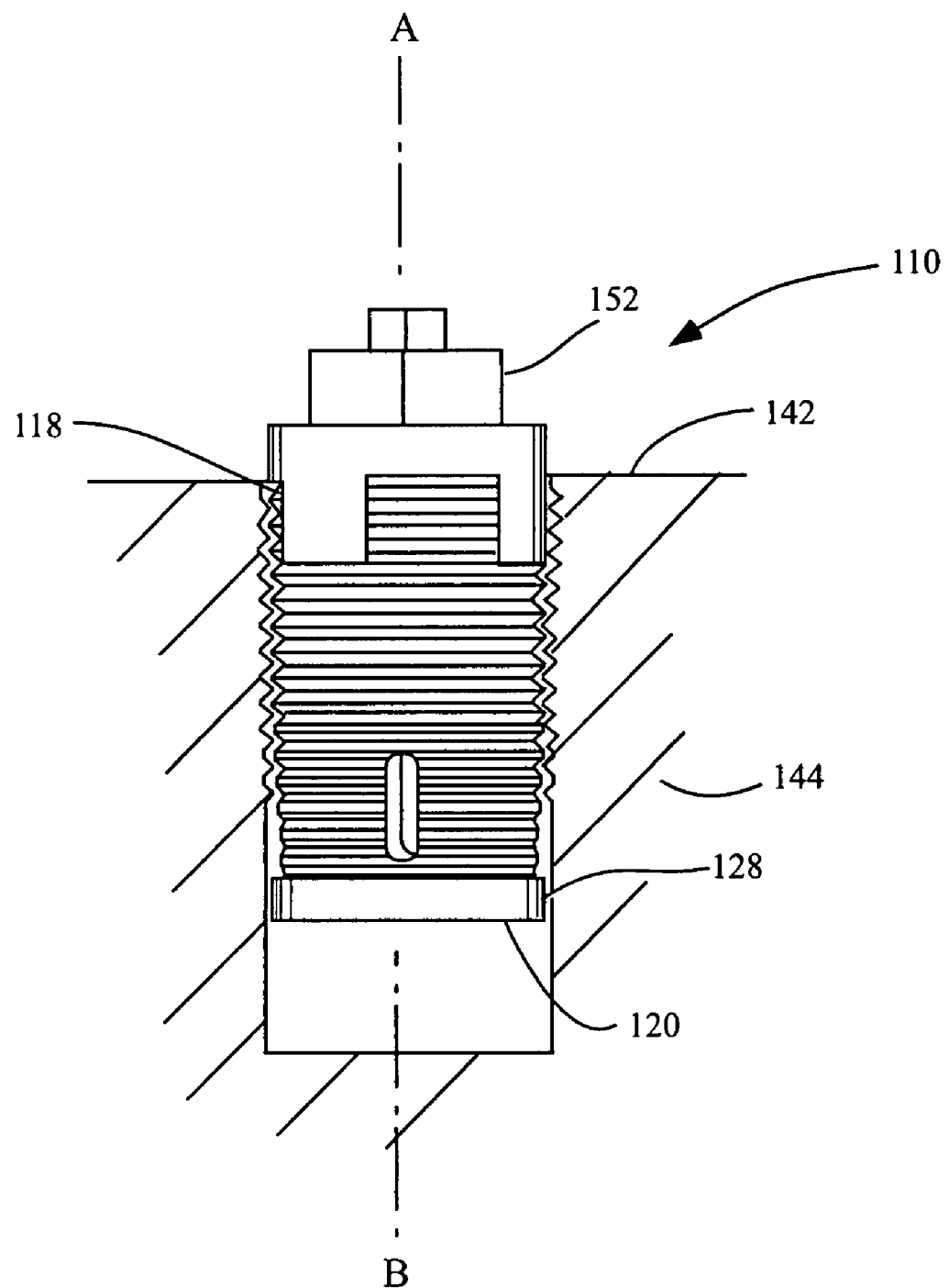
FIG. 12 depicts an embodiment of the disclosed self-tapping insert disposed within the borehole of a workpiece prior to the removal of the driving head.

Cylindrical body 112 has a top 118 which, as shown schematically in FIG. 12, is the end which will be approximately flush with the top surface 142 of the work piece 144 and a bottom 120 which is the end first inserted into the pilot hole. Cylindrical body 112 is configured to have an interior portion 122, which comprises all surfaces and structures on the inside of the cylindrical body, which may include a first set of interior threads 126. However, as described above, in some applications it may be desirable to replace a damaged smooth bore, in which case an embodiment of the disclosed apparatus may comprise a self-tapping sleeve without having internal threads 126 shown in FIG. 11.

If present, the interior threads 126 will typically conform to the size and type of the damaged threads being replaced. The interior threads 126 may generally be of all thread types, including USS, UNC, SAE, metric, standard pipe thread, metric pipe thread, British Special Pipe, Acme, etc.

Cylindrical body 112 also has an exterior portion 124, which term refers to all surfaces and structures on the exterior of the cylindrical body. As shown on FIG. 11, the cylindrical body 112 defines a central axis A. The exterior portion 124 comprises, in relative order from the bottom 120 of the cylindrical body, a pilot section 128, a plurality of cutting threads 130, and a plurality of engagement threads 132.

Pilot section 128 has a diameter D and a first length L as shown in FIG. 9. As shown in FIG. 9 and other figures, the diameter D of the pilot section 128 defines a plane which is perpendicular to the central axis A of the cylindrical body 112. Diameter D is sized to penetrate the smooth bore of the pilot hole, which is usually made by drilling out damaged threads. First length L is configured to maintain the central axis A of the self-tapping insert in general alignment with the longitudinal axis B of the smooth bore, as shown in FIG. 12.

Pilot section 128 may have a constant diameter D along its entire length. Diameter D is sized such that the pilot section 128 penetrates the smooth bore, but the tolerances between the smooth bore and pilot section are relatively close. For example the tolerance between the internal diameter of the smooth bore and diameter D may range from 0.003 to 0.006 inches per side. For example, if a pilot hole is drilled with a 1 7/16 inch drill bit, creating a pilot hole having an internal diameter of approximately 1.4375 inches, diameter D of pilot section 128 may be 1.432 inches, leaving a total tolerance of 5.5 thousandths of an inch, or slightly less than 3 thousandths per side.

Cylindrical body 112 comprises a plurality of apertures 134 which extend from the exterior portion 124 to the interior portion 122. The side of the apertures 134 on the exterior portion 124 are bounded on opposing sides of the aperture by a leading edge 136 and the trailing edge 138. One embodiment of the self-tapping insert comprises left-handed cutting threads 130 and left-handed engagement threads 132 on the exterior portion 124. This embodiment is installed by rotating the self-tapping insert 110 counter-clockwise, as indicated on FIG. 7. As the self-tapping insert is rotated, leading edge 136 will tap new threads as it progresses through the smooth bore. As the new threads are cut, metal chips or strips will be cut from the smooth bore, some of which will be gathered into the interior portion 122 of the cylindrical body 112 through apertures 134. The axis of apertures 134 may be normal to the wall of the cylindrical body, such that the axis of the aperture coincides with a radius of the cylindrical body 112. Alternatively, to assist in directing metal chips to the interior portion 122, the axis of the apertures 134 may be offset from the radius by a small amount, such as fifteen degrees.

In the prior art insert 20, the leading edge 34 is the same radial distance from the center of the insert as the trailing edge, i.e., the opposing side of the aperture. As a result, chips cut by the rotation of the leading edge against the interior wall of the bore hole tend to be driven into the newly cut threads, thereby causing binding and galling of the threads and increasing the torque required to properly seat the insert into the bore hole.

In contrast, an embodiment of the disclosed apparatus comprises a leading edge 136 which has a greater radial distance from the center of the insert than the trailing edge 138. The "height" (i.e., the radial extension) of the leading edge may be greater than that of the trailing edge. In other words, if a first diameter is defined by the rotation of the leading edge 136 about the central axis A and a second diameter is defined by the rotation of the trailing edge 138 about the central axis, the first diameter will be greater than the second diameter. This feature is best shown in FIG. 19, which shows the difference in radial extension between the leading edge 136 and the trailing edge 138.

This feature, known as "chip relief", serves to direct chips to the interior portion 122 of the insert rather than forcing chips into the newly cut threads. The resulting reduction of galling and binding reduces the torque required to seat the insert into the bore hole.

In the prior art insert 20, a benefit of the drive bolt 28 is that it provides internal support to the self-tapping insert, thereby reducing the risk of the insert collapsing as it is driven into the borehole of the workpiece 44. As best shown in FIG. 11, the disclosed self-tapping insert may comprise, as part of the means for installing the insert, an insert support plug 116. The insert support plug 116 comprises a threaded plug member 140. Threaded plug member 140 will have threads 146 which are make up to interior threads 126. The insert support plug 116 further comprises an axially-aligned thread stud 148 which extends from the threaded plug member 140, through and out of the top 118 of cylindrical body 112 and through driving head 114. Axially-aligned threaded stud 148 may be secured to the driving head 114 with nut 150.

Driving head 114 is utilized to rotate the self-tapping insert 110. Driving head 114 may comprise a hex head 152 to which may be attached the desired socket or wrench for rotating the self-tapping insert 110. This end of the driving head 114 may be referred to as the "tool engagement end." The opposite end of the driving head 114 may be referred to as the "insert engagement end" because it engages the self-tapping insert. As best shown in FIG. 11, the insert engagement end of the driving head 114 may comprise a plurality of castellations 154, which engage matching castellations 156 on the top 118 of the cylindrical body 112. Utilizing castellations 154, 156 to rotate the self-tapping insert 110 facilitates the use of left-handed threads on the exterior portion 124 of the insert while having right-handed threads for the interior threads 126. As illustrated in FIG. 12, the use of castellations 154, 156 also allows, if desired, a self-tapping insert 110 to be set below the top surface 142 of the workpiece 144, because the outside diameter of the driving head 114 is no larger than the outside diameter of the cylindrical body 112.

FIG. 20 shows an embodiment 110' which comprises a pilot extension member 158 which is removeably attached to the device, such as to the insert support plug 116' The insert support plug 116' comprises an axially-aligned threaded stud 148' which extends on both sides of the threaded plug member 140'. The pilot extension member 158 may comprise a large diameter section 162 and a small diameter section 164. The large diameter section 162 has approximately the same outside diameter as the pilot section 128. When the pilot extension member 158 is attached to this embodiment of the self-tapping insert 110', it increases the effective length of the pilot section 128. This increase in effective length allows greater penetration of the device within the pilot hole, thereby reducing the angle of deflection between the longitudinal axis of the smooth bore and the central axis of the self-tapping insert. The pilot extension member 158 may be utilized in cases in which the tolerances between the smooth bore and the pilot section are so large as to allow excessive play between the smooth bore and the pilot section, which may, without the pilot extension member, result in a misaligned self-tapping insert. It is to be appreciated that a pilot extension member 158 may comprise external threads on small diameter section 162 which engage the internal threads 126 of the interior portion 122. However, attaching the pilot extension member 158 to the insert support plug 116' prevents possible damage to internal threads 126 which might otherwise result.

When the pilot extension member 158 is utilized, the whole apparatus, including the pilot extension member 158, is placed within the bore hole. The self-tapping insert 110' is then rotated several turns to cut new threads. The apparatus is thereafter removed from the bore hole and the pilot extension member 158 is removed from the apparatus. The apparatus is thereafter rotated into the new threads, and further rotated with a tool to complete the cutting of the threads and to set insert as described above. The pilot extension member 158 allows several threads to be cut with the self-tapping insert 110' which are sufficient to axially align the insert with the bore hole. Once a few threads are cut and the extension member removed, the self-tapping insert may be screwed into the new threads and the axial alignment maintained for the completion of the installation.

The self-tapping insert may further comprise chip recovery means, such as structural features in the insert support plug 116 which collect chips, such as recesses or collection ports. Alternatively, as shown in FIG. 16, the chip recovery means may comprise a magnet 160. A magnet 160 may be attached to the insert support plug 116', such as by press fit, or fastener. The magnet 160 is sized to fit inside the interior portion 122 of cylindrical body 112. When the insert is set within the workpiece, nut 150 is removed, driving head 114 lifted off of the cylindrical body 112, and the insert support plug 116, 116' is unscrewed from the cylindrical body 112. If magnet 160 is utilized, it will be removed with insert support plug 116', along with any chips which are collected by the magnet.

These and other features, aspects, and advantages of the present invention will become better understood with regard to the following description, appended claims, and accompanying drawings. While the above is a description of various embodiments of the present invention, further modifications may be employed without departing from the spirit and scope of the present invention. For example, the size, shape, and/or material of the various components may be changed as desired. Thus the scope of the invention should not be limited by the specific structures disclosed. Instead the true scope of the invention should be determined by the following claims.

What is claimed is:

1. A self-tapping insert for disposing within a smooth bore, said self-tapping insert comprising:
   a cylindrical body having a top, a bottom, an interior portion and an exterior portion, the cylindrical body defining a central axis;
   the exterior portion comprising, in relative order from the bottom of the cylindrical body, a pilot section, a plurality of cutting threads, the cutting threads comprising a leading edge and a trailing edge for cutting insert locking threads in the smooth bore, and a plurality of engagement threads, the engagement threads sized to engage the insert locking threads;
   the pilot section having a diameter and a first length, the diameter sized to penetrate the smooth bore and the first length configured to maintain the central axis of the self-tapping insert in alignment with the longitudinal axis of the smooth bore;
   a removable pilot extension member extending forward of the pilot section; and
   driving means for driving the cylindrical body into the smooth bore.

2. The self-tapping insert of claim 1 wherein the interior portion comprises a first set of threads.

3. The self-tapping insert of claim 2 wherein the driving means comprises an insert support plug, wherein the insert support plug comprises a threaded plug member which makes up to the first set of threads and an axially-aligned threaded stud which extends from the threaded plug member and extends through the top of the cylindrical body.

4. The self-tapping insert of claim 3 wherein the top of the cylindrical body comprises a first plurality of castellations.

5. The self-tapping insert of claim 4 wherein the driving means comprises a driving head comprising an insert engagement end and a tool engagement end.

6. The self-tapping insert of claim 5 wherein the insert engagement end comprises a second plurality of castellations, the second plurality of castellations configured to engage the first plurality of castellations.

7. The self-tapping insert of claim 5 wherein the axially-aligned thread stud extends through the driving head and secured by a nut.

8. The self-tapping insert of claim of claim 3 wherein the pilot extension member comprises a large diameter section having the same approximate diameter as the pilot section.

9. The self-tapping insert of claim 8 wherein the pilot extension member is removeably attached to the insert support plug.

10. The self-tapping insert of claim 1 wherein the diameter of the pilot section defines a plane generally perpendicular to the central axis.

11. The self-tapping insert of claim 1 wherein the tolerance between the pilot section and the smooth bore is less than six-thousandths of an inch per side.

12. The self-tapping insert of claim 1 wherein the diameter of the pilot section is substantially uniform along the first length.

13. The self-tapping insert of claim 1 wherein the cylindrical body comprises a plurality of apertures extending from the exterior portion to the interior portion, wherein the apertures on the exterior portion are bounded on opposing sides by the leading edge and the trailing edge.

14. The self-tapping insert of claim 13 wherein a first diameter is defined by the rotation of the leading edge about the central axis and a second diameter is defined by the rotation of the trailing edge about the central axis, and the first diameter is greater than the second diameter.

15. The self-tapping insert of claim 1 wherein the cutting threads and the plurality of engagement threads are left-handed threads.

16. The self-tapping insert of claim 1 further comprising chip recovery means.

17. The self-tapping insert of claim 16 wherein the chip recovery means comprises a magnet contained within the interior portion.

* * * * *